United States Patent

Truong et al.

[11] Patent Number: 6,160,873
[45] Date of Patent: *Dec. 12, 2000

[54] SYSTEM AND METHOD FOR REMOTELY INITIALIZING, OPERATING AND MONITORING A GENERAL-PURPOSE COMPUTER

[75] Inventors: Minh Cong Truong, Sandy, Utah; James H. Olenski, Gilbert, Ariz.

[73] Assignee: Micro Computer Technology, Inc., Sandy, Utah

[*] Notice: This patent issued on a continued prosecution application filed under 37 CFR 1.53(d), and is subject to the twenty year patent term provisions of 35 U.S.C. 154(a)(2).

[21] Appl. No.: 09/281,029

[22] Filed: Mar. 30, 1999

Related U.S. Application Data

[60] Provisional application No. 60/079,946, Mar. 30, 1998.

[51] Int. Cl.$^7$ .................................................. H04M 11/00
[52] U.S. Cl. .................................. 379/102.02; 379/93.26; 713/310
[58] Field of Search .......................... 379/102.01–102.04, 379/102.07, 106.01, 93.01, 93.05–93.07, 93.18, 93.24–93.28; 307/66; 713/310, 323

[56] References Cited

U.S. PATENT DOCUMENTS

| | | | |
|---|---|---|---|
| 3,582,554 | 6/1971 | Le Blang | 179/2 |
| 3,783,193 | 1/1974 | Lee | 179/2 |
| 4,051,326 | 9/1977 | Badagnani et al. | 179/2 |
| 4,181,909 | 1/1980 | Pyeatte et al. | 340/147 |
| 4,479,122 | 10/1984 | Redman et al. | 340/825.06 |
| 4,491,690 | 1/1985 | Daley | 179/2 |
| 4,596,900 | 6/1986 | Jackson | 179/2 |
| 4,918,721 | 4/1990 | Hashimoto | 379/96 |
| 4,996,706 | 2/1991 | Cho | 379/102.04 |
| 5,146,568 | 9/1992 | Flaherty et al. | 395/325 |
| 5,257,384 | 10/1993 | Farrand et al. | 395/725 |
| 5,272,382 | 12/1993 | Heald et al. | 307/66 |
| 5,280,627 | 1/1994 | Flaherty et al. | 395/700 |
| 5,283,905 | 2/1994 | Saadeh et al. | 395/750 |
| 5,309,563 | 5/1994 | Farrand et al. | 395/200 |
| 5,347,646 | 9/1994 | Hirosawa et al. | 395/575 |
| 5,349,675 | 9/1994 | Fitzgerald et al. | 379/102.01 |
| 5,388,154 | 2/1995 | Solomon | 379/368 |
| 5,410,706 | 4/1995 | Farrand et al. | 395/700 |
| 5,434,973 | 7/1995 | Lu | 395/200 |
| 5,440,699 | 8/1995 | Farrand et al. | 395/155 |
| 5,537,462 | 7/1996 | Utter et al. | 379/102 |
| 5,561,710 | 10/1996 | Helms | 379/97 |
| 5,596,628 | 1/1997 | Klein | 379/93 |
| 5,675,800 | 10/1997 | Fisher, Jr. et al. | 395/700 |
| 5,680,547 | 10/1997 | Chang | 395/200.01 |
| 5,701,417 | 12/1997 | Lewis et al. | 395/200.16 |
| 5,717,927 | 2/1998 | Bergler et al. | 395/676 |

*Primary Examiner*—Wing F. Chan
*Attorney, Agent, or Firm*—Lerner, David, Littenberg, Krumholz & Mentlik, LLP

[57] ABSTRACT

A system and method for allowing remote initialization, operation, and monitoring of a general-purpose computer and its power supply through bi-directional control of the computer by a remote user, whereby DTMF tones, generated by a telephone at the user end, are received and converted to keyboard control signals, allowing for operations executable by the computer to be remotely generated, including checking system status, executing "Power-ON" and "Power-OFF" commands, cold booting and warm booting the computer, as well as operating the host computer with respect to its operating system and application software, even where there has been a catastrophic malfunction of the host computer and even where the computer includes an ATX motherboard.

11 Claims, 9 Drawing Sheets

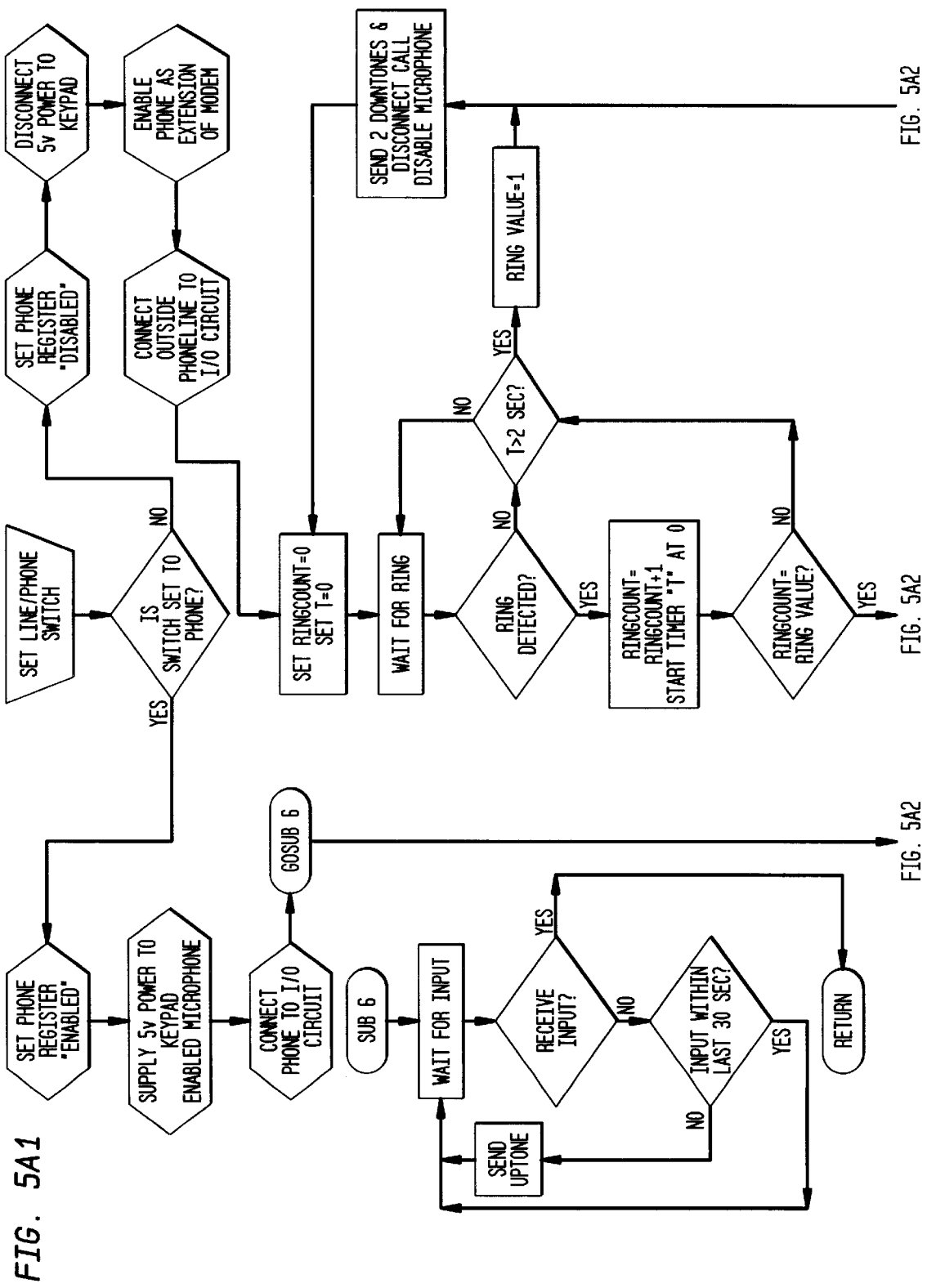
FIG. 5A1

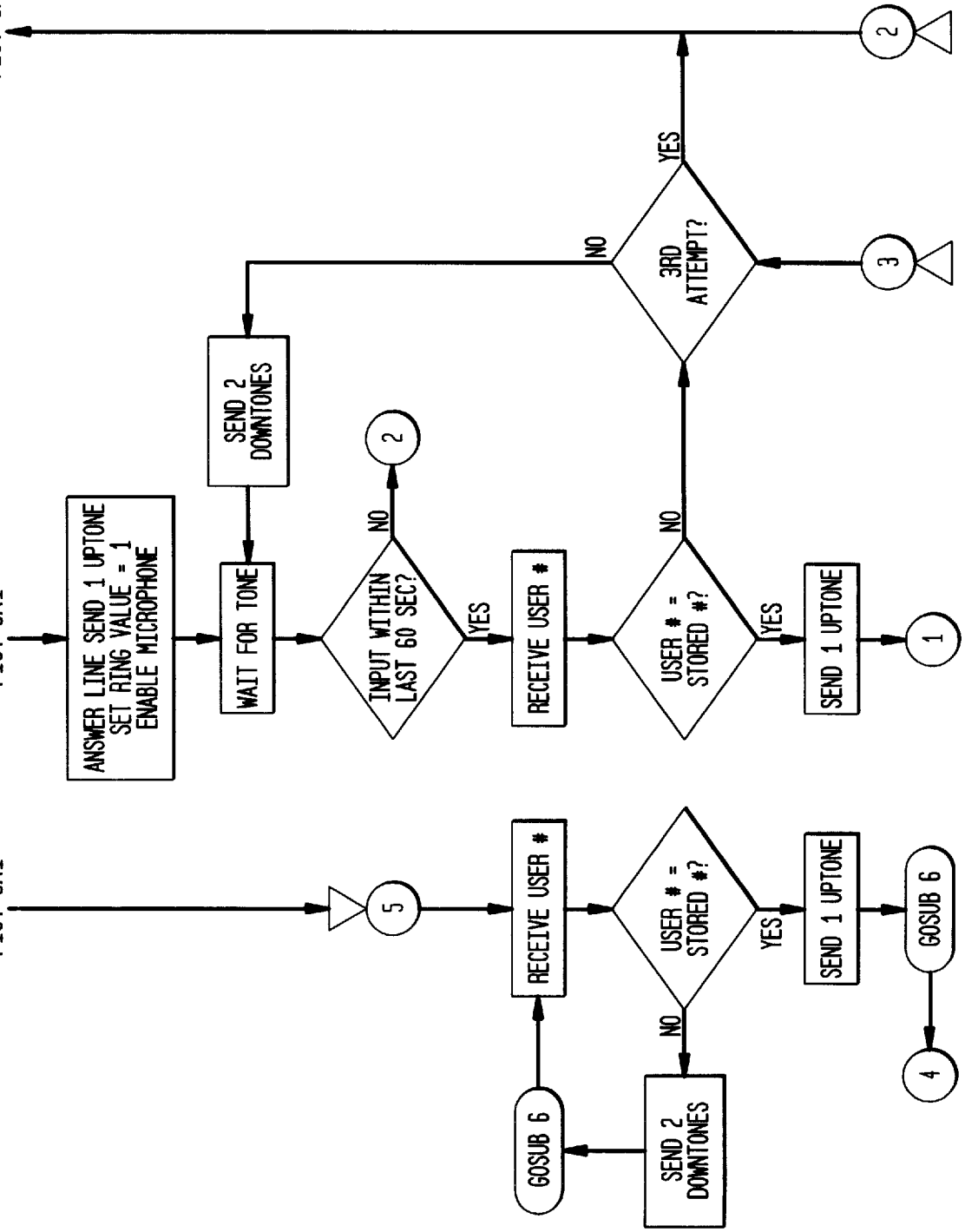

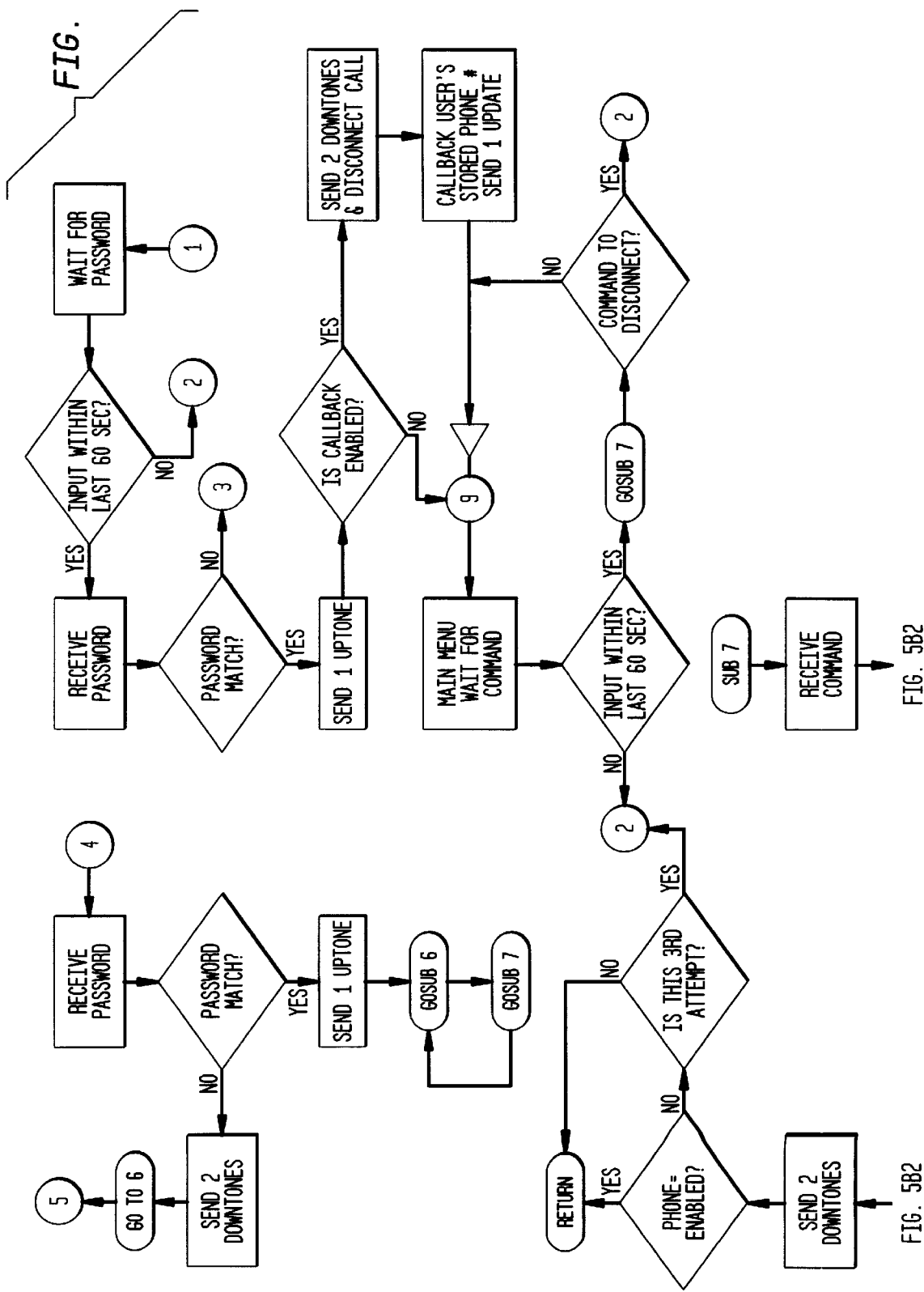

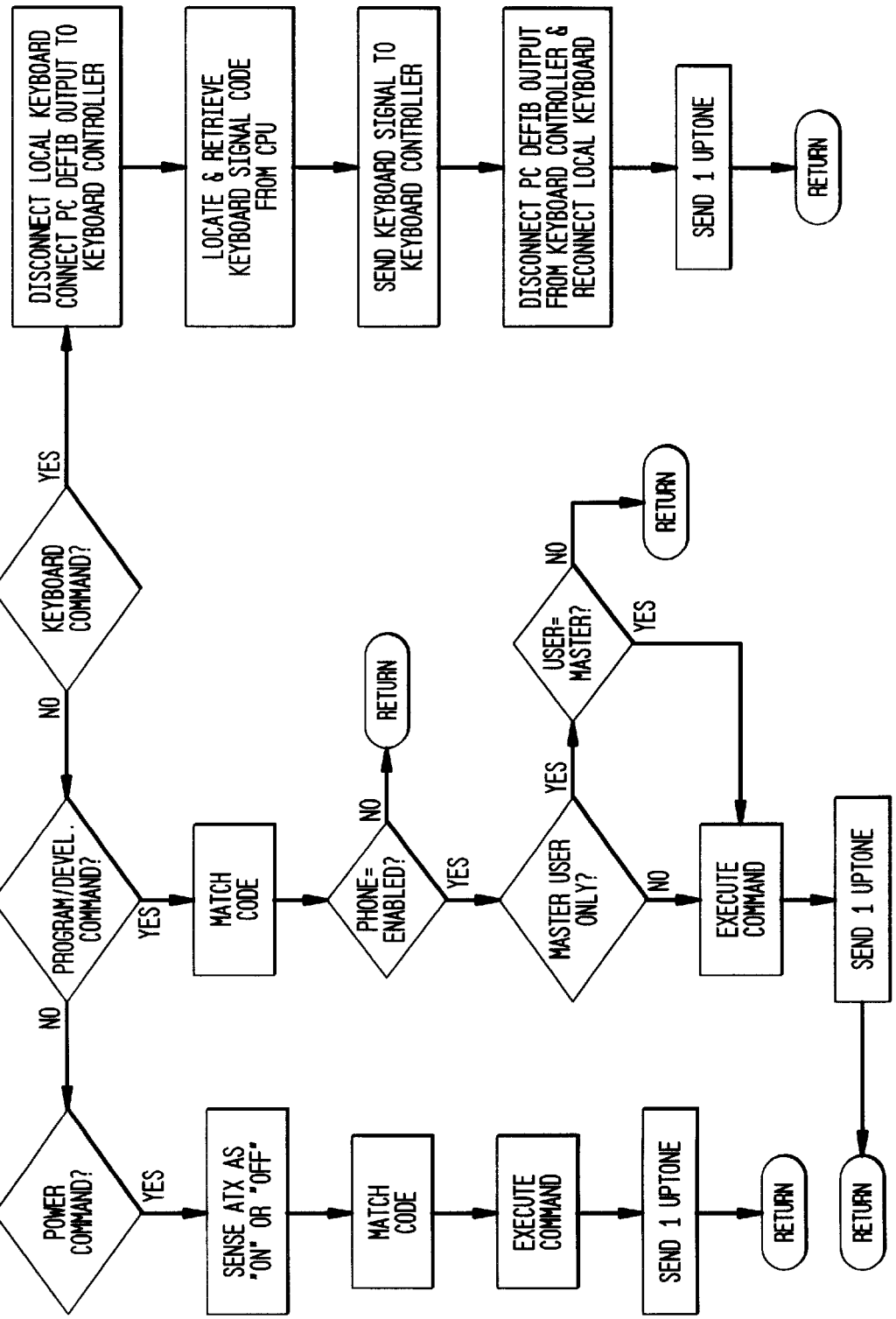
FIG. 5B2

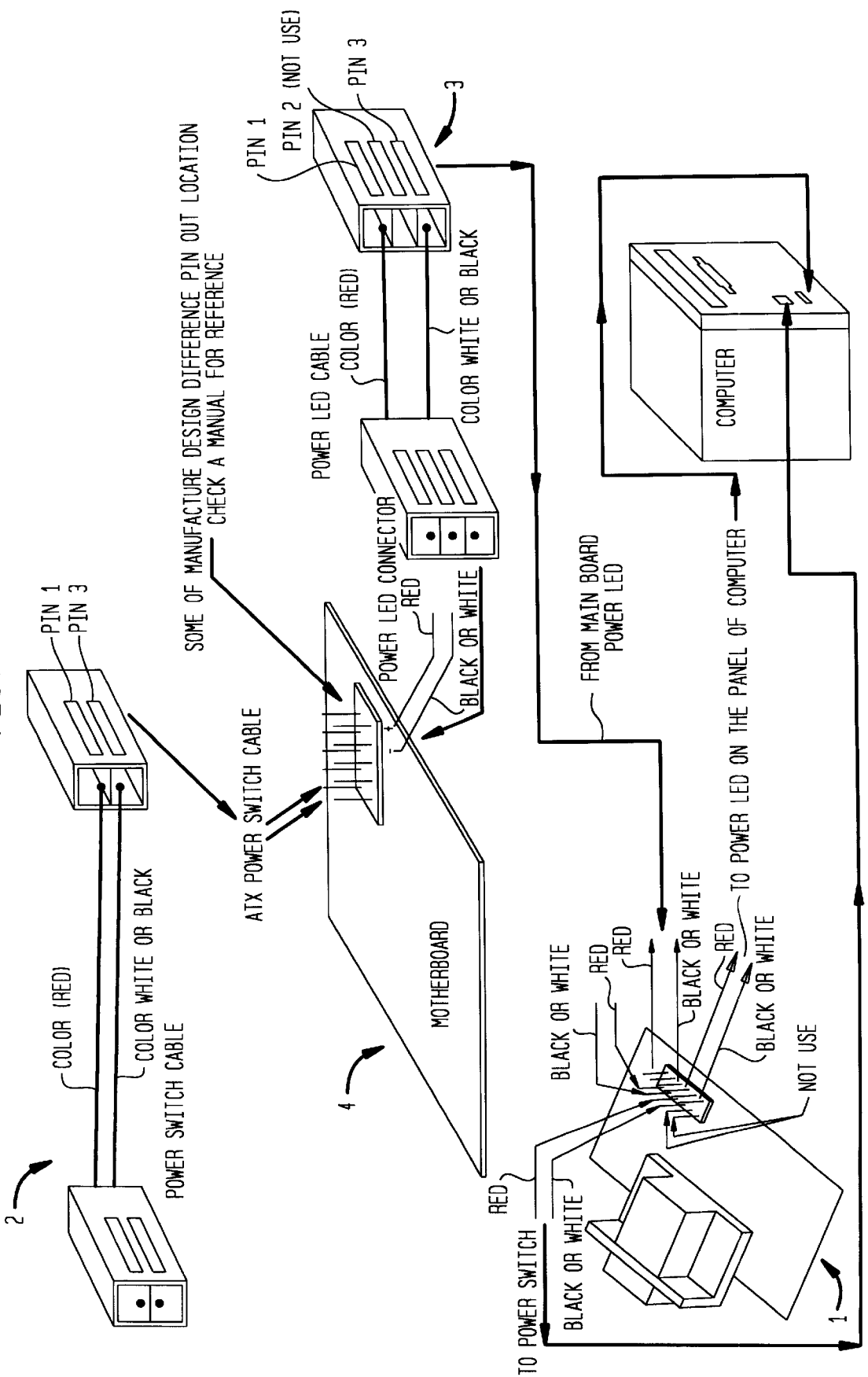

SYSTEM AND METHOD FOR REMOTELY INITIALIZING, OPERATING AND MONITORING A GENERAL-PURPOSE COMPUTER

CROSS REFERENCE TO RELATED APPLICATIONS

The present application claims the benefit of commonly assigned U.S. Provisional Application Ser. No. 60/079,946, filed Mar. 30, 1998, the disclosure of which is hereby incorporated by reference herein.

FIELD OF THE INVENTION

The present invention relates to a system and method for remotely initializing, operating, and monitoring a general-purpose computer. More particularly, the present invention relates to a system and method for remotely initializing a general-purpose computer from an inoperable state, using Dual Tone Modulating Frequency ("DTMF") tones generated by, for example, a touch-tone telephone, to remotely operate and monitor the general-purpose computer from the remote location, via the telephone and its keypad.

BACKGROUND OF THE INVENTION

For purposes of this disclosure, a "general-purpose computer" or "computer" comprises both hardware and software. The hardware includes physical devices, such as the motherboard and the keyboard controller. The software includes computer-readable programs of instructions, which manipulate the physical devices to operate. The programs include both application programs and system programs. Application programs perform specific tasks for a user, such as solving specific problems. The system software controls the hardware of the computer and the execution of the application programs. System software further includes operating system software, which controls the central processing unit or CPU of the computer, and device drivers, which control the input and output devices (I/O), such as printers, scanners, keyboards, pointing devices, and the like.

Also, for purposes of this disclosure, the term "remote" refers to any physical separation between the DTMF tone generator (e.g., the telephone) and the accessed or host general-purpose computer. The distance may be as near as between two rooms in the same facility or as far as between two distant locations around the world.

Remotely initializing and operating a general-purpose computer is known in the prior art. Certain of the systems often require a remote computer to communicate with the host computer or network via a telephone line and modem. Certain methods for accomplishing these remote sessions require remote control application software, which must be installed on the host computer as well as the remote computer.

PC Anywhere® and Laplink® are two examples of such commercially available remote control software programs. These types of remote control software are capable of delivering keystrokes to a host computer via modem-to-modem connections, network connections or serial port connections. However, for a successful link to occur, a computer at the remote end is required to run the remote control software and transmit and receive data signals. Also, the host computer and the remote computer must be in active or operable states, with both computers successfully running the remote control software program. If the host computer malfunctions, there are no means available to remotely reboot or recycle it to continue the remote session. Perfect operation of the remote and the host computers, correct communication settings, correct protocols, including the perfect operation and correct modality of the application software, are all required to have any remote control capability at all. Some system commands are possible. However, their exercise may cause irreversible, fatal conditions that preclude further remote communications or control. These devices are unable to act on the host computer's power supply. They also are incapable of executing a remote ON command, an actual "cold boot", or any other command if the host has suffered any diminution of its operational function.

Other known methods use a selective tone generating telephone as the input device for remotely accessing and controlling the host computer. For example, U.S. Pat. No. 3,582,554 issued to LeBlang discloses apparatus for converting a touch-tone telephone into a remote computer terminal. This is accomplished by a required display panel, which enables the computer terminal user to read the numerical characters that the user and the computer are transmitting to each other. The display panel is coupled either electromagnetically or acoustically to the remote telephone, and converts the communicated audible tones into visually displayed decimal numerals. A modem at the host computer location is required for the remote user to communicate with the host computer. In addition, the host computer has to be in an active state and software needs to be running when the user calls from the remote location. Otherwise, a connection cannot be made and no subsequent exchange of data is possible.

Other known prior art includes the subject matter disclosed in U.S. Pat. Nos. 5,257,384; 5,309,563; 5,410,706; and 5,440,699, all issued to Farrand et al., and all commonly assigned to Compaq Computer Corporation of Houston, Texas. Those patents, in general, disclose systems for remotely rebooting and controlling a host computer. As stated in the '706 Farrand et al patent, for instance, "cold booting" is accomplished by the remote computer simulating the effect of power cycling on the host computer and "warm booting" is accomplished by emulation of the "control" "alt"-"del" keystrokes. The '706 patent, however, requires both a host and remote computer, which must be fully operational or at least have some low level of system operation for a successful link to occur. At the very least, the Compaq patents require the system manager device driver and the network operation system to be minimally operational to accept commands from the system manager. In addition, all commands are accomplished by way of an echo command being issued by the system manager of the networked computer system over the host computer's bus, which includes issuing separate commands in a bus I/O transfer.

Thus, the Compaq patents disclose systems that require minimal system operation of the host computer and successful connection to it via synchronous or asynchronous connections. These systems also require the use of a remote computer and the transmission of data signals. DTMF tones are only utilized for alert signals to the remote user.

Other known prior art includes the powering of a computer using DTMF tones. For example, U.S. Pat. No. 5,596,628 issued to Klein discloses a system for monitoring a telephone line and responding to an incoming signal by powering a computer, and then routing the call to any one of an answering machine, modem or facsimile machine, depending on the nature of the received signal. The Klein system discloses a unidirectional communication with the accessed or host computer. In addition, the user is limited to one of four pre-programmed signals (or any number of user-programmed signals) to the device, which then sends the corresponding series of pre-programmed keystrokes to the computer. The signal always results in either the de-powering of the computer (e.g., a DTRST command) or the launching of application software. The Klein system receives a DTMF signal and the system itself interacts with the host computer, excluding the user from direct access to and control over the host computer. Finally, the host computer must be in an operable status for any operations to be accomplished. If, during the cold boot, the host computer malfunctions, it cannot be corrected from the remote location.

U.S. Pat. No. 5,537,462 issued to Utter discloses a means to activate a normally "OFF" computer terminal and initiate a bi-directional communication between the remote terminal and host computer within the confines of the application software running in the host computer. The receipt of a DTMF tone over a telephone line powers the computer. The Utter patent, however, requires the host computer to be in an operable state when it attempts to power it. If the host computer malfunctions, however, Utter does not provide a way to remotely restore it to an operational status. Finally, the remote control of the host or accessed computer is by way of another remote computer.

In sum, Klein and Utter disclose systems whereby a user-generated DTMF tone triggers a pre-set instruction set in the device. These instructions are executed on the host computer's power supply and/or the host computer, without checking the status of the host computer. A successful link is achieved, therefore, only if the host computer is operating properly. If the host computer experiences any of a wide range of possible malfunctions, there is no mechanism shown in Klein and Utter by which to effect a remedy at the host computer site.

Other known prior art includes "smart" power management systems such as APC's devices. The art embodied in the APC power management device is designed to exercise remote power control of a host computer. These devices control power by one of several methods of communication. A data signal is sent to the device by either direct modem connection or by modem connection through the Internet. In either case, a plurality of relays are activated in the order selected by the user to power various outlets in a power supply, which, in turn, may power a host computer. The basic device controls only the host computer's power source and assumes that the host computer will become operational solely upon the activation of its power source. More involved versions of the same device permit real-time exercise of remote control through the addition of so-called "smart" modules. One such "smart" module contains hardware and software that enable monitoring of the host computer with automated instructions for orderly shutdown while the device supplies temporary power during a power failure. System management is achievable through the addition of a module that permits the device to act as an arbitrator and conduit through an RS232 serial port connection to the host's system agent or system management software. The modules may be used simultaneously to achieve a high degree of remote control.

Here, too, the system management capabilities would not be functional if the host computer experiences a catastrophic failure or malfunction. For example, no system management is possible if the host computer has lost its serial port connection due to any of a wide variety of system malfunctions. Moreover, the module that effects an orderly shutdown is incapable of doing so if the host computer has experienced any of a wide variety of system failures. Additionally, these systems do not support the re-booting of a host computer equipped with an ATX motherboard. Finally, if the host computer has failed, re-cycling and restoring power to the controlled power outlets does not always satisfactorily re-boot or control the host computer.

Accordingly, there is a need for a system and method for remotely initializing, operating, and monitoring a host computer, which is cognizant of the status of the host computer, and which is capable of remotely correcting malfunctions of the host computer. There is also a need for a system and method that enables a remote user to disconnect, and/or reconnect, a host computer to its power source, execute an actual cold boot and/or reboot (or warm boot) of the host computer and then remedy system malfunctions from the remote location. Furthermore, it would be desirable to have a system and method that is capable of remotely re-booting a host computer equipped with an ATX motherboard. It would further be desirable to have a system and method that enables a remote user to control a host computer and its power supply, regardless of the operating status of the host computer. It would also be desirable to have a system and method that enables such remote control, even if the host computer has failed due to any of a wide variety of fatal system errors, malfunctions, operational diminution of the system, or other conditions commonly called "system failures", "crashes" or "lock-ups." It would be desirable to have a system and method that enables real-time remote keystroke insertion and power control with results being reported to the remote user in real time, bi-directionally, and without software operating on the host computer. It would be desirable to have a system and method that enables any of the aforementioned remote capabilities using a standard touch-tone telephone (without the need for a remote computer). Finally, it would be desirable to have a system and method that is capable of remotely turning the computer OFF and then ON again to both conserve energy from a power management standpoint and to allow for security of the host computer by preventing access to a non-authorized user who may be at the host computer's location.

SUMMARY OF THE INVENTION

The present invention addresses these needs and desires.

In general, the present invention enables a remote user to operate the host computer and/or remotely control the power supply, using a telephone's DTMF tones as control signals. Certain features of the present invention allow for the remote user to deliver all keystrokes available on the host computer's local keyboard from the remote location. Other features provide several remote control capabilities. The following list of capabilities is not meant to be exhaustive, but merely illustrative of features of the present invention:

1. The ability to monitor, detect and receive information regarding the host computer's operating conditions, including its power status, and then to act appropriately based on this detected information by signaling the remote user of the host computer's status and the results of the user's actions all being done in a bi-directional manner to allow for real-time operation by the remote user of the host computer;
2. The ability to exercise operational control over a host computer that has suffered a system failure, "lock-up" or "crash" and to correct such condition regardless of the operational status of the host computer;

3. The ability to effect either an orderly or emergency shut down of the host computer (including one equipped with an ATX motherboard) culminating in a disconnection of the host computer from its power source;

4. The ability to re-connect a host computer to its power source, to actuate a power switch if a host is equippe d with an ATX motherboard, and the ability to re-boot the host computer; and 5. The ability to program the device utilizing the keypad of a local telephone set (connected to the host computer) as an input/output device.

In accordance with one aspect of the present invention, there is provided an apparatus for remotely operating a general-purpose computer. The apparatus comprises a telephone line inter face for receiving a plurality of remotely generated DTMF tones; a data access arrangement (DAA) device coupled to said telephone line interface for detecting and routing the received DTMF tones; a DTMF tone transceiver coupled to said DAA device for receiving and converting the received DiMF tones to corresponding digital signals; a CPU coupled to said DTMF tone transceiver for receiving and converting the digital signals to keyboard data signals; and a switch coupled to said CPU for routing the keyboard data signals to the local keyboard controller to operate the general purpose computer, whereby the keyboard data signals are substituted for the general purpose computer's keyboard controller's signals. Preferably, the apparatus further includes a power supply coupled to the CPU for providing power to the general-purpose computer. More preferably, the DTMF tones include a Power-ON command, which is converted and routed through to the power supply, which, in turn, is instructed to power the general-purpose computer from an inactive state. Most preferably, the power supply powers the motherboard of the general-purpose computer.

Alternatively, the apparatus is capable of executing a de-powering command, whereby the power supply is instructed to de-power the general-purpose computer. Preferably, the power supply de-powers the motherboard of the general-purpose computer.

Preferably, the apparatus is capable of executing a recycling command, whereby the power supply is instructed to reinitialize the general-purpose computer.

In another preferred embodiment of the present invention, the apparatus comprising an ATX detector coupled to said CPU for detecting the presence of an ATX-type motherboard in the general-purpose computer.

In another aspect of the present invention, there is provided a method for remotely operating a general-purpose computer, comprising the steps of: receiving a plurality of remotely generated DTMF tones; disabling the local keyboard of the general-purpose computer; converting said plurality of DTMF tones into keyboard data signals; and sending said keyboard data signals to the general-purpose computer's keyboard controller to operate the general-purpose computer, whereby the general-purpose computer executes keystroke commands in accordance with said keyboard data signals, including all system and operating platform commands, as if said keyboard data signals were coming from the general-purpose computer's local keyboard. Preferably the converting step includes the step of converting the plurality of DTMF tones into corresponding digital signals. More preferably, the converting step comprises the steps of receiving said plurality of DTMF tones through a data access arrangement (DAA) device; routing said plurality of DTMF tones to a DTMF transceiver for converting said plurality of DTMF tones into corresponding digital signals; and transmitting said corresponding digital signals to a CPU, wherein the CPU compares the incoming digital signal with an embedded conversion table to thereby convert the digital signal into a keyboard control signal for controlling the general purpose computer.

BRIEF DESCRIPTION OF THE DRAWINGS

The above and other features, aspects and advantages of the present invention will become apparent, as will a better understanding of the concepts underlying the present invention, by reference to the description which follows and refers to the accompanying drawings, in which:

FIGS. 5A and 5B are flowcharts, illustrating the operation protocol of a preferred embodiment of the present invention; and FIG. 6 is a schematic block diagram of the wire connection for the ATX junction board feature of this embodiment of the present invention.

DETAILED DESCRIPTION OF THE PREFERRED EMBODIMENTS

The present invention will now be described more fully with reference to the accompanying drawings, in which preferred embodiments of the invention are shown. The present invention, however, may be embodied in many different forms and should not be construed as limited to the embodiments set forth herein.

Figure 1:
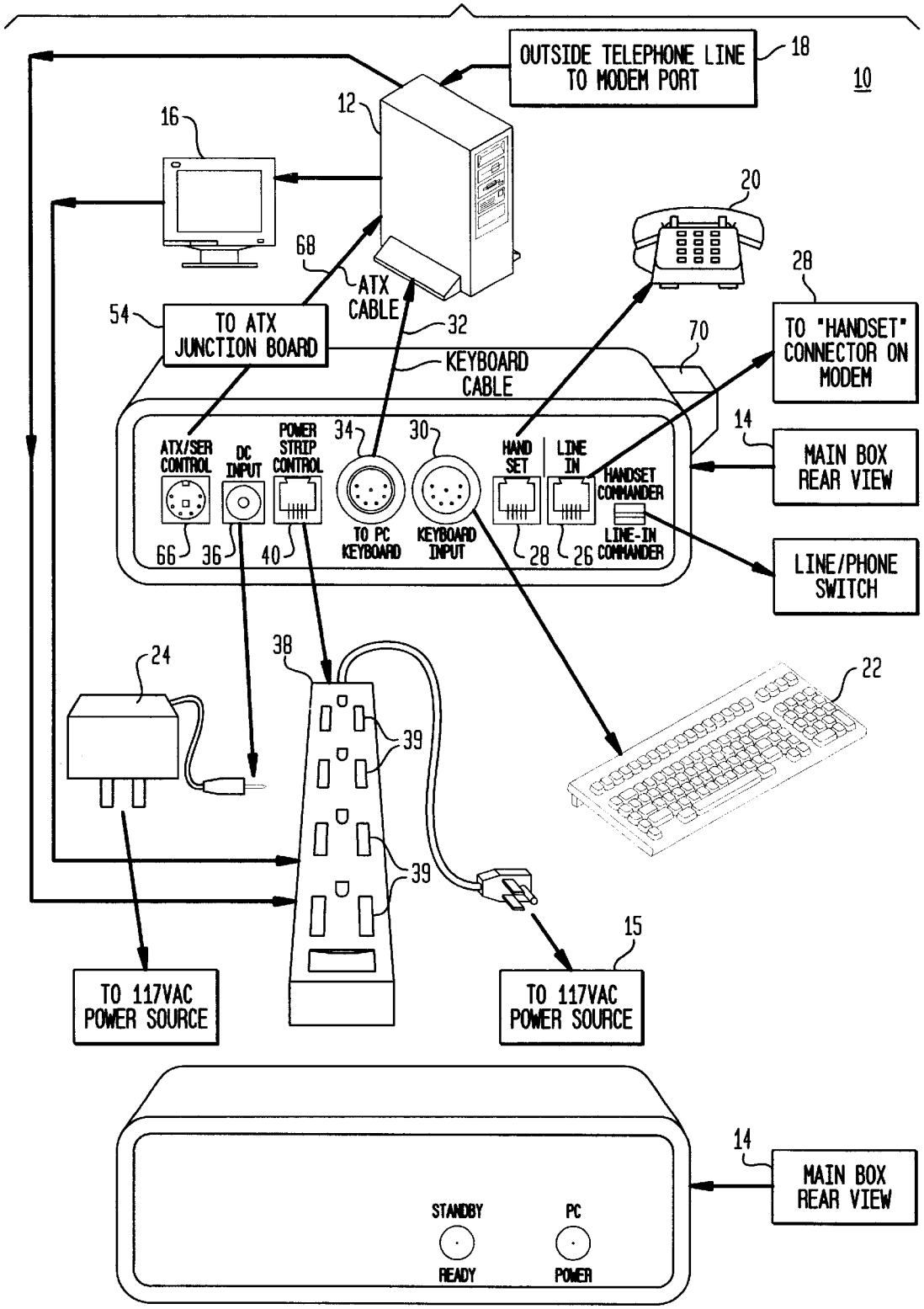
FIG. 1 is system block diagram of a host computer and the remote control apparatus in accordance with a preferred embodiment of the present invention.

Referring now to FIG. 1, a block diagram of a system 10, including a general-purpose host computer 12, a remote control apparatus 14, and local touch-tone telephone set 20, is illustrated.

The host computer 12 includes a monitor 16 and a standard IBM PC compatible keyboard 22, and any other hardware and software components commonly associated with a general-purpose computer. The host computer 12 also comprises a computer operating system containing a CPU, microprocessors, a main system board, chipsets, system buses, device drivers, connectors, and other components found in a typical computer operating system. The main system board (motherboard)(not shown) may be either an ATX or non-ATX type. For illustrative purposes only, an ATX motherboard system will be assumed. The CPU chip is an Intel 80286 or higher, or any brand that is equivalent to this Intel CPU chip. The operating platform utilizes a DOS-type, MS DOS version 5.0 or higher, such as Windows 95, Windows 98, or Windows NT.

The host computer 12 may be configured as a server that is part of a network of any type, including a LAN or a WAN, a client on a network of any type, including a LAN or a WAN, or a "stand-alone" personal computer. Any such system may be equipped with a standard modem, but need not be accessible to a 117 VAC power source 15, and an active, standard outside telephone line 18 (actual line not shown). The local keyboard 22 is connected to the host computer 12 by way of the apparatus 14 as shown in FIG. 1. A DC power adapter 24 is connected to the 117 VAC power source 15. The host computer 12 is connected to the monitor 16 via the monitor's integral cable, providing typical I/O functions and control.

As one method of receiving a DTMF tone, there is provided a standard computer modem and its driver, which are installed in the host computer 12. In such case, the outside telephone line 18 has an active, analog connection to a typical telephone service and may be connected to the "line in" RJ11 jack or port on the host computer's modem (not shown). In such case, a standard telephone cable interconnects the "hand set" 28 (line-out) RJ11 jack of the host computer's modem with the line in port 26, an RJ11 jack, on the apparatus 14, providing two-way signal transmission.

In the alternative, the apparatus 14 may include a separate outside telephone line, in addition to or instead of the modem line, that is connected directly to the apparatus, line in port 26. In this case, the cable interconnecting the host computer 12 and the apparatus 14 is not used. By use of a dedicated telephone line, the apparatus 14 is able to bypass any lock-ups that may occur when utilizing the modem. Thus, by this method, a virtually fail-safe method of communicating with and operating the host computer is achieved. For example, only hardware failure will prevent a successful practice of the present invention because the system is not dependent upon the modem as a means to communicate with the host computer.

The telephone set 20 is a standard touch-tone telephone that is connected to the hand set telephone port 28, an RJ11 jack on the apparatus 14, via a standard telephone cable, providing two-way signal transmission. This is used to pre-program the values into the CPU of the apparatus and NVRAM where the user program values reside. This can also be accomplished by way of the host computer. In this regard, the host computer will have installed application software to perform those tasks performed by the telephone set 20 and designed to enable programming of the apparatus.

The keyboard 22 is connected to the preferred embodiment of the apparatus 14 at its keyboard input port 30 via the keyboard's integral cable and an adapter (not shown). This provides a means for the apparatus 14 to acquire signal input from the local keyboard 22. A keyboard cable 32, connects the keyboard output port 34 of the apparatus 14 to the keyboard input port of the host computer 12 (not shown), providing keyboard signal to the host computer 12.

The power adapter 24 is connected to a standard 117 VAC power source 15. Its integral cable is connected to the DC input port 36 on the apparatus 14. A 9 volt DC power is supplied to the apparatus 14.

The power strip 38 is connected via its integral power cord to a standard 117 VAC power source 15. The power strip 38 is interconnected via a standard telephone cable to the power strip port 40, an RJ11 jack located on the apparatus 14 thus providing signal transmission. The host computer 12, the monitor 16 and all other peripheral components of the host computer system (such as a printer) are connected to the outlets 39 located on the power strip 38 via their respective power cords (not shown), supplying 117 VAC power to these devices.

In operation, DTMF signals are transmitted over an ordinary outside telephone line 18 from a remote, standard touch-tone telephone, to the modem port of a host computer 12 (the modem itself is not used as part of this transmission) that is connected to the apparatus 14. In fact, it is desirable to have the modem in an inactive state so that the signal is re-routed to the telephone line input port 26. In the alternative, the signals are transmitted directly to the line input port 26. All remote keystrokes are created by the preferred embodiment of the apparatus 14 by translating the remote DTMF tones into digitized keyboard signals. The apparatus 14 receives a keyboard signal, disables the local keyboard 22, substitutes the remote signal in its stead, and sends the remotely generated, decoded keyboard signal directly to the keyboard controller of the host computer 12. The apparatus 14 thereby executes any remote keystroke signal, including all system and operating platform commands, on the host computer 12 as though the local keyboard 22 generated it.

Figure 2:
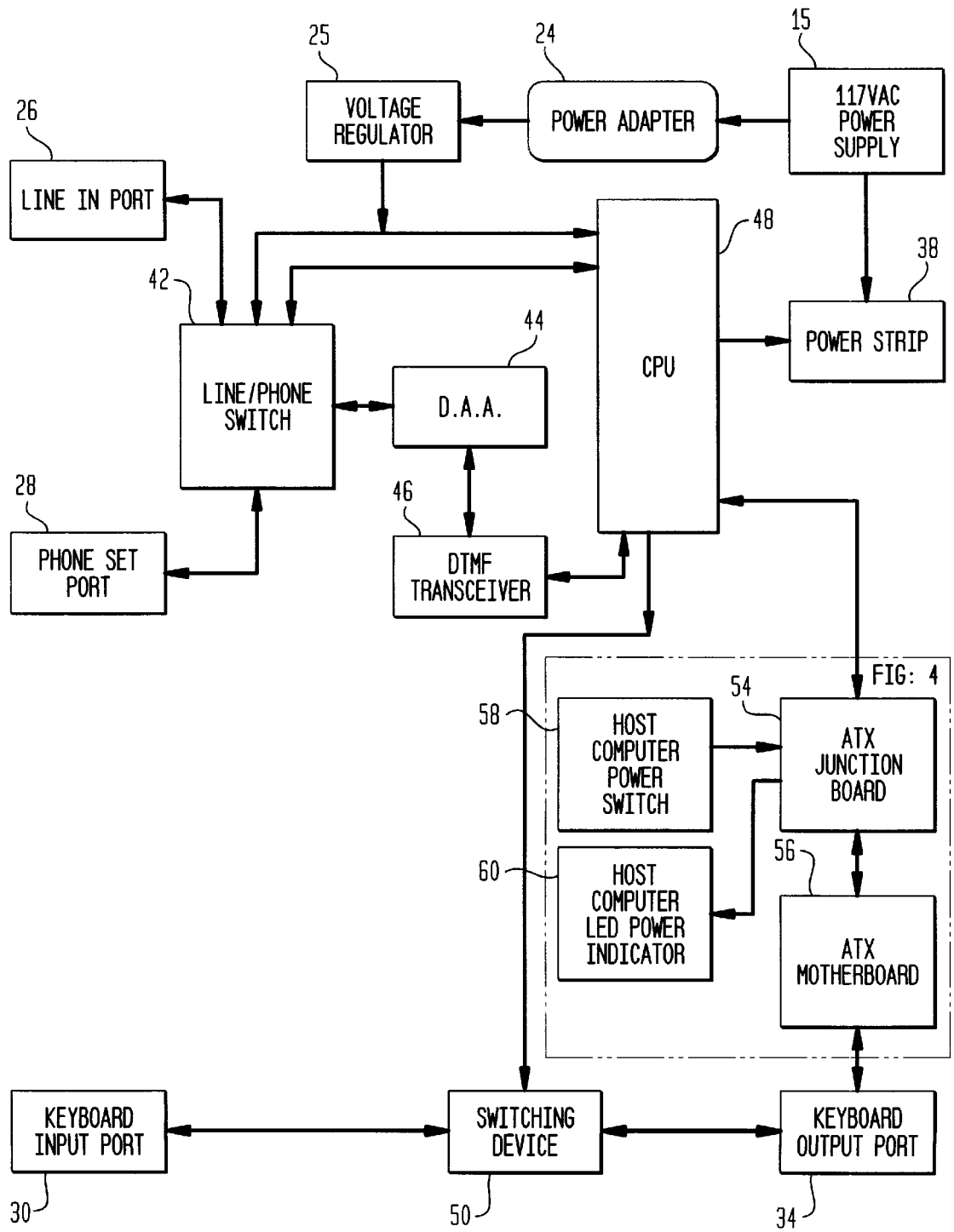
FIG. 2 is a block diagram, illustrating various components of the apparatus and host computer of FIG. 1.

Referring now to FIG. 2, the flow of DTMF signals, digital signals, low voltage power and line voltage power (117 VAC) to, from and within the apparatus 14 is shown. FIG. 2 includes the line/phone switch 42 and its ports, the voltage regulator 25, the Data Access Arrangement ("DAA") 44, the DTMF transceiver 46, the switching device 50 and the apparatus' 14 CPU 48. The diagram also demonstrates the apparatus' 14 ATX junction board 54, the host computer's 12 ATX motherboard 56, its power switch 58 and its LED Power Indicator 60.

In practicing this preferred embodiment of the apparatus 14, a master user first programs his user number, master password and callback number. To accomplish this, the line/phone switch 42 of the apparatus 14 is set to telephone, enabling the telephone set 20 (see FIG. 1) as the apparatus' 14 I/O device. The user inputs programming instructions in the form of DTMF signals, which are then routed to the DAA 44 and then to the DTMF transceiver 46. The decoded signal is sent to the CPU 48 of the apparatus 14 wherein arbitration logic loads the programmed values into the appropriate locations in the CPU 48.

Thereafter, the apparatus 14 will allow only the master user to control the remaining programmable security features. The master user may practice the apparatus 14 by the same method to set the remaining 9 user numbers, their associated passwords, and their respective callback numbers, enabling only authorized users to remotely access and use the apparatus 14. The user programs the ring count, which is described, along with the callback feature, below.

When programming is concluded, and in the normal operational mode, the line/phone switch 42 is reset to line-in. An authorized remote user then may place a call to the modem number of the host computer 12 or in the alternative the telephone number of the dedicated line.

Upon connection to the apparatus 14, the CPU 48 sends an ascending tone through the DAA 44 to the outside telephone line 18, providing feedback by signaling the remote user that a connection has been made to the apparatus 14 and prompting the user for its user number. At this point, the user and apparatus 14 are communicating bi-directionally. At this point, system security is ensured, as the apparatus must confirm user identification and password before it will allow user to access and control the host computer or power supply.

The remote user then inputs his user number. The DAA 44 routes the signal to the DTMF transceiver 46, which decodes and passes the input to the CPU 48. The CPU 48 sends another ascending tone to the remote user, prompting the user to input his password. The CPU 48 compares the decoded input to the password stored in the NVRAM of the CPU 48. In the event that the user does not input the correct password by the third attempt, the CPU 48 directs the DAA 44 to disconnect the user. This facility provides security and thereby prevents unauthorized access and control of the host computer through the apparatus 14.

Assuming a correct password is input, the DAA 44 now routes all subsequent incoming signals through the DTMF transceiver 46, which converts the received analog DTMF tone to a corresponding digital (binary) signal that is then routed to the CPU 48.

The CPU 48, upon start-up or receipt of an incoming ring, sets the ring count for the next call to a value of 1. The CPU 48 causes the DAA 44 to answer the next incoming call on the set ring count (the first ring by default), effectively precluding (pre-empting) the host computer's modem from answering. This feature assures that the remote user can establish a connection with the apparatus 14 regardless of the state of the host computer 12 or its modem.

Alternatively, the remote user may instruct the CPU 48 to set the ring count to a value from 1 to 7 for the next incoming call, or instruct the DAA 44 not to answer the next call at all. Since the host computer's modem is normally set to answer by the third ring of an incoming call, an opportunity to establish a modem to modem session by setting the ring count to a higher value is thusly provided, without the intervention of, or interaction with, the apparatus 14. This facility also enables the apparatus 14 to share the outside telephone line 18 with the host computer's modem and enables the user to control whether the next call is answered by the modem or the apparatus 14.

If the host computer's modem is the intended target of a telephone call, but fails to answer such a call by its preset ring count, the apparatus 14 answers on its higher value ring count. The remote user is thereby afforded and assured access to the apparatus 14 and control of the host computer 12 in the event that the host computer's modem fails to answer in its pre-set number of rings.

When the CPU 48 detects an incoming ring, it automatically resets the ring count for the next call to the default value of 1, unless the remote user subsequently sets it to a higher value during the session. The apparatus 14 thereby provides a remote user with a reliable method of re-establishing a connection with the apparatus 14 in the event that the modem does answer.

The master user may also set the apparatus 14 to require the use of the remote user callback number. Upon remotely accessing the apparatus 14, the user inputs his user number and password. The CPU 48 compares the user input to its stored values and if they match, the apparatus 14 will disconnect and then place a call to the remote user at the stored callback number. The apparatus 14 thereby provides an additional, optional level of security.

The apparatus 14 is accessed on an incoming call by the above steps and then controls the ensuing bidirectional transmission. The CPU 48 executes several actions after receiving a remote user command directed to the host computer 12. First, the DTMF tones are received by the DAA, then routed to the DTMF transceiver for converting the tones into corresponding digital signals. Next, the CPU 48 converts the digital signals to equivalent IBM PC keyboard data signals (or a string of signals). Third, the CPU 48 actuates the switching device 50, momentarily substituting the CPU's 48 output for the host computer's local keyboard output, thus connecting the apparatus° CPU 48 output to the keyboard output port 34. Finally, the CPU48 sends the keystroke signal (s) through the pathway just described, reaching the host computer's keyboard controller via the host computer's normal PC keyboard connector. The CPU 48, upon sending such command, also sends one or more ascending tones to the DAA 44 and then to the outside telephone line 18 to prompt the remote user for his next command 12.

As a result of this method, the host computer 12 does not detect any difference between the apparatus' 14 signal and its local PC keyboard 22 signal. The apparatus 14 thereby effects the capability to send every keystroke available on local keyboard (and every macro) to the host computer 12 via a telephone, utilizing only DTMF tones, with results that are identical to local keyboard strokes input directly at the host computer's console.

The CPU 48 comprises a microprocessor, NV (non-volatile) RAM and ROM. The user passwords, callback numbers, ring count and all codes (keystroke algorithms, macros, etc.) are stored by and distributed among these components. In addition to containing all individual keyboard strokes, the CPU's codes include commands that will "hold" certain keystrokes until they are revoked by subsequent and different user commands. This facility enables the remote user to execute, for example, "Control-ON", "Alt-ON "Shift-ON", such that subsequent keystrokes are interpreted by the host computer 12 as a though the key that was so enabled, or was depressed simultaneously with subsequent keystrokes. Hence, a "Control-ON" signal followed by "Alt-ON" and then by "Del" is received as a "Control-Alt-Del" command by the host computer. Through this way, the apparatus 14 effects multi-key command capabilities.

The CPU 48 contains 6 pre-programmed "macros" for commonly used commands. For example, the remote user can issue a single DTMF command that closes all Windows 95 applications, shuts down Windows 95, turns the power strip 38 OFF, and disconnects the remote user. The CPU 48 also contains 37 commands for the control of apparatus 14 and its components.

The remote user also has the option to program up to 10 macros, to be triggered and executed later by the remote user with a DTMF command. The user may also remotely launch any macro that is stored on the host computer system (usually associated with a "function key" such as F1, F2, etc.) simply by sending the signal that corresponds to that function key. Many cellular telephones are capable of storing strings of DTMF tone sequences that can be used as macros to command the computer, including time delays. Therefore, the present invention contemplates portable or cellular telephones to be used to practice the present invention. For that matter any DTMF tone generating device may be used at the remote location for generating the DTMF tones, including another general-purpose computer.

The following table illustrates a conversion table in accordance with one preferred embodiment of the present invention:

TABLE 1

DTMF Tone Conversion Table

Scrambler Password: mrmct
\# Display Scrambler code if customer forgot the Password.
\* Bypass user ID or Password
\*23 Enter the new serial number

TABLE 1-continued

DTMF Tone Conversion Table

*24 Re-Enter Serial number with password protection "852261"
*67 Load password default: 123456
*68 Return value of memory location
*50 Call Back
*55 Off Hook
*54 Cycle Relay to Off Hook and On Hook until user enters Esc, ending loop and going On Hook
System Links: to access up to 255 DeFib units from a single phone line System can be link up to 255 units, master = 00 and jumper CN14 and CN19 close pin 5
Setup station ID.
*95, then 00 for master 01 to 255 for slaves
Check Station ID.
*95*, then 00..255, (00 for master 01..255 for slaves), the "ready" LED is will fast blink for 15 seconds.
Station Switch Control.
*95# Then station ID 00 = master 01..255 for slave. If the slave unit is not activated in 2 minutes the master is will automatically reset control and communication to master unit.
Quick Reference Code.

*80 Do Not Answer Next Call.
*89 Windows Shut Down Sequence. (Factory Macro)
*90 Emergency Power Off.
*91 Warm Boot (RESET) Alt + Ctrl + Delete. (Factory Macro)
*97 Power Up System, launch operating platform. User input of Windows & network passwords is required. (Factory Macro)
*98 Power Up System, launch operating platform. Windows/ Network passwords are not required. (Factory Macro)
*99 Emergency Power On.
Special Instructions.

*46 Set "Sleep mode" for ATX motherboard host (command is host system BIOS dependent)
*49, 0 System Boot up with NumLock OFF (Factory Macro)
*49, 1 System Boot up with NumLock ON. (Factory Macro)
The above must be set correctly to run macros.
*56 Hang up Phone (Disconnect & Logout).

Call Back Numbers:
Only the Master User can use this command.
*51, 0..9 (user #), Callback number, # Sets callback number for up to 10-different users. Phone number can be up to 14 digits. After number is input, press # to save.
Example for user #0:
*51, wait for uptone, then enter "0" (user #), then enter the phone number 18012630734 followed by the # sign to save.

Call Back Enabled and Disabled:
Only the Master User can use this command.
*51, (user #), *1 = Enable callback feature for this user
*51, (user #), *0 = Disable callback feature for this user
Example Enable for user #1:
*51, 1, *1
Example Disable for user #1:
*51, 1, *0
[Or during the same time enter the phone number when is done Press *1 to Enable the phone. And when the firmware see is *1 they will automatic save that number, no need to Press the # - Minh, eliminate this aspect; it's confusing].

Password "Lost" Scrambles CODE:
Set PC Defib to Handset mode. When prompted for "user #", press #.
This displays scrambler code on monitor. Call tech support and with proper ID, you will be given the Master User's password.

Set Password:
Only the master can use this command.
*71, 0..9 (user #), (new password), (new password)
Example, changing password for user #1:
*71, wait for 2 up tones, input user # "1", wait for uptone, input new password (up to 6 digits), wait for uptone, re-enter new password. If it matches first entry, up tone is sent and password is been saved. If there is a verification error, two down tones are sent and nothing is changed.
Land line Instructions: (non-Handset Mode)

TABLE 1-continued

DTMF Tone Conversion Table

Ring Count setup
*8, 0 = Do not answer next call. After ringing has stopped for 30 seconds, set PC DeFib to answer next call on first ring.
*8, 1–7 = Set ring count for next call to 1 to 7 rings.

Macros Setting (▨▨▨▨▨▨) and Running.
0*, 0..9 (macro #), (instruction set), 9* = Set Macro command ready to write, then press 0 to 9 for the macro number.
9* = Save current Macro.
Example Creating Macro #1:
0*, 1, wait for uptone, begin writing Macro, when is done Hit 9* to save. 4 uptones confirm action.
0#, 0..9 (Macro #) = Runs macro.
Example Running Macro 3:
0#, 3 Runs Macro #3.
Timing Delay Between commands:

*, 1..9 where 1 = 10 Seconds, 2 = 20 Seconds, ..., 9 = 90 Seconds, introduces a corresponding timing delay prior to the sending of the next instruction.
Example of typical Macro to launch system in "wait for call" mode to enable a PC Anywhere session upon the next call. We will designate this as Macro #8:
Set switch to "Handset Mode", then enter:
"0*, 8, *01, *01, *06, 71, 71, ##, ##, #*1, *02, 21, *77, 42, *66, 61, ##, 9*"
0*, 8 = Setting macro number 8
*01, *01 = Sends 2 Esc commands, making sure that host reverts to the "Desk top Menu"
*06 = Pops up "Start Menu"
71 = Sends a P, activating the "Program Menu"
71 = Sends another P to go to the first application on the start menu beginning with "P". This section may require more P's be sent to scroll down to the PC-Anywhere application.
## = Sends Enter to get in directory menu of PC-Anywhere.
## = Sends Enter to start running PC-Anywhere.
*1 = Waiting 10 Seconds to make sure program is up and running
*02 = Turn on Alt Key
21 = Activate "Action" drop down menu
*77 = Turn off Alt key
42 = Send H to selected the Host folder.
*66 = Send Right Arrow to active the icon in the host folder
61 = Sends M to selected Modem mode
## = Sends Enter to run Host ready.
*87 = Don't answer next call until the $7^{th}$ ring to give host modem an opportunity to answer.
9* = Saving current Macro.
Standard Characters Keyboard Code Commands:

21 = A, 22 = B, 23 = C.
31 = D, 32 = E, 33 = F.
41 = G, 42 = H, 43 = I.
51 = J, 52 = K, 53 = L.
61 = M, 62 = N, 63 = O.
71 = P, 72 = R, 73 = S, 74 = Q.
81 = T, 82 = U, 83 = V.
91 = W, 92 = X, 93 = Y, 94 = Z.
Number.

0 = 0
1 = 1..#9 = 9.
Function & Control Keys:

*#1 = F1.
*#2 = F2..*#9 = F9.
*#0 = F10.
*02 = Turn ON Alt Key.
*77 = Turn OFF Alt Key
*03 = Turn ON Ctrl Key
*78 = Turn OFF Ctrl Key
*10 = Turn ON Shift Key
*79 = Turn OFF Shift Key
Special Keys:

*00 = Backspace
*04 = Tab
*05 = Space
*07 = Delete

TABLE 1-continued

DTMF Tone Conversion Table

*08 = Colon
*09 = Semi Colon
*11 = Equal
*12 = Dot
*13 = Comma
*14 = Plus
*15 = Minus
*16 = Forward Slash = /
*17 = SquareLeft = [
*18 = Square Right = ]
*19 = Back Slash = \
*20 = Up Arrow
*44 = Left Arrow
*45 = Power Status = 2 Uptones is power On, 2 Downtones is Power Off. (Factory Macro)
*66 = Right Arrow
*88 = Down Arrow
Codes Reserve:

*21 Reserve
*23–*43 Reserve
*57 Reserve
*92 Reserve
*93 Reserve
*94 Reserve
*96 Reserve The remote user, through the aforementioned methods using the apparatus 14, has the ability to create complicated strings of commands, including their timing, which can later be triggered and executed on a host computer 12. These methods are essential to the ability of a remote user to take remedial action to restore a failed or "locked-up" host computer 12, to change settings and to launch application software that enables subsequent modem to modem communications.

The power switch of a non-ATX is set to ON by the user, and remains in that position permanently. At all times thereafter, the host computer's 12 power is controlled locally by actuating the power switch on the apparatus 14, which, in turn, controls the power strip 38.

Figure 3:
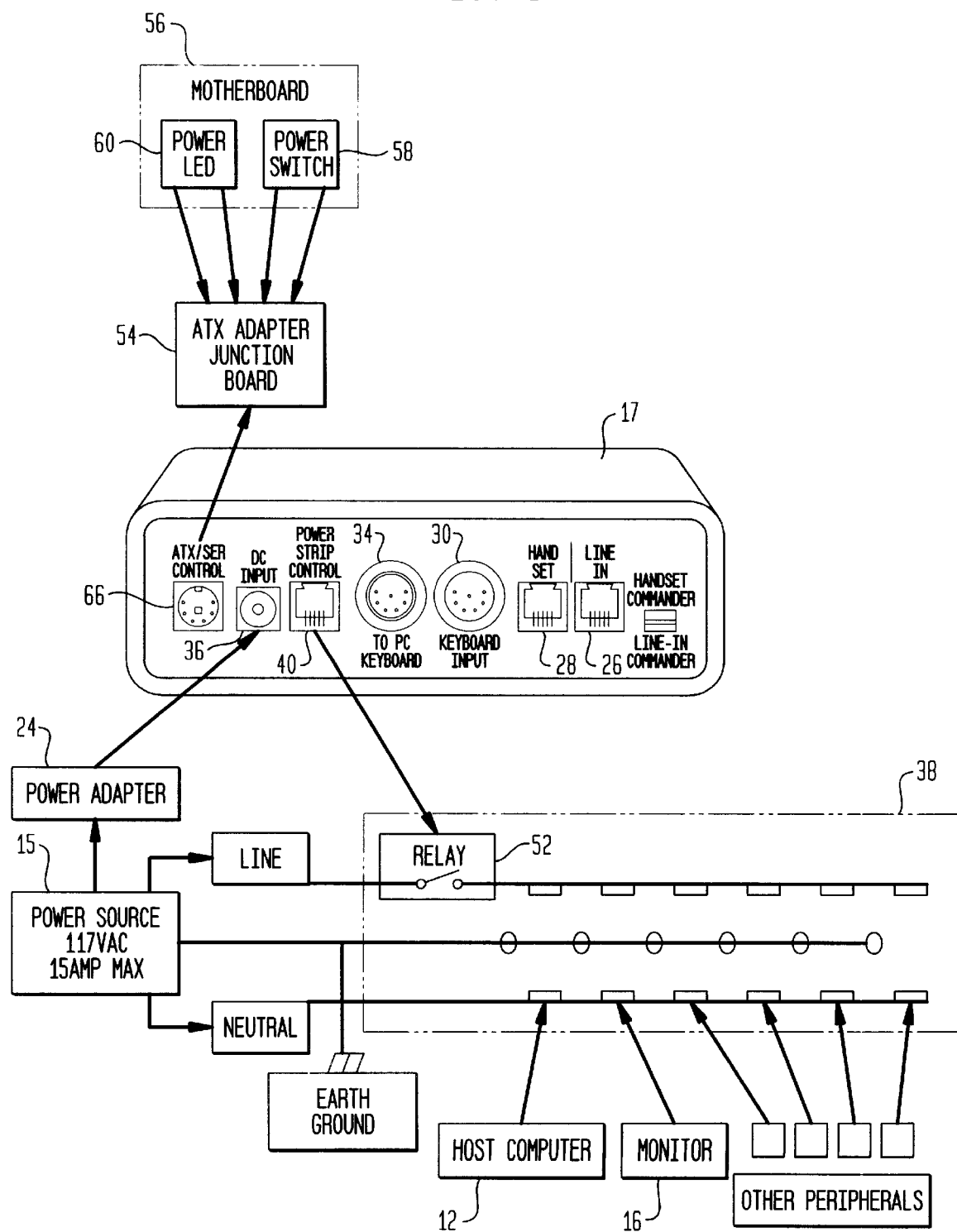
FIG. 3 is a block diagram of a power source of FIG. 1.

FIG. 3 is a block diagram of an embodiment of the apparatus' 14 power strip 38 and the host computer 12 that demonstrates the relationship, physical connection and configuration of these components. The diagram illustrates the connection of the power strip 38 and the power adapter 24 to the 117 VAC power source 15. It also illustrates the connection of the power adapter 24 and the relay 52 to the apparatus 14.

Figure 4:
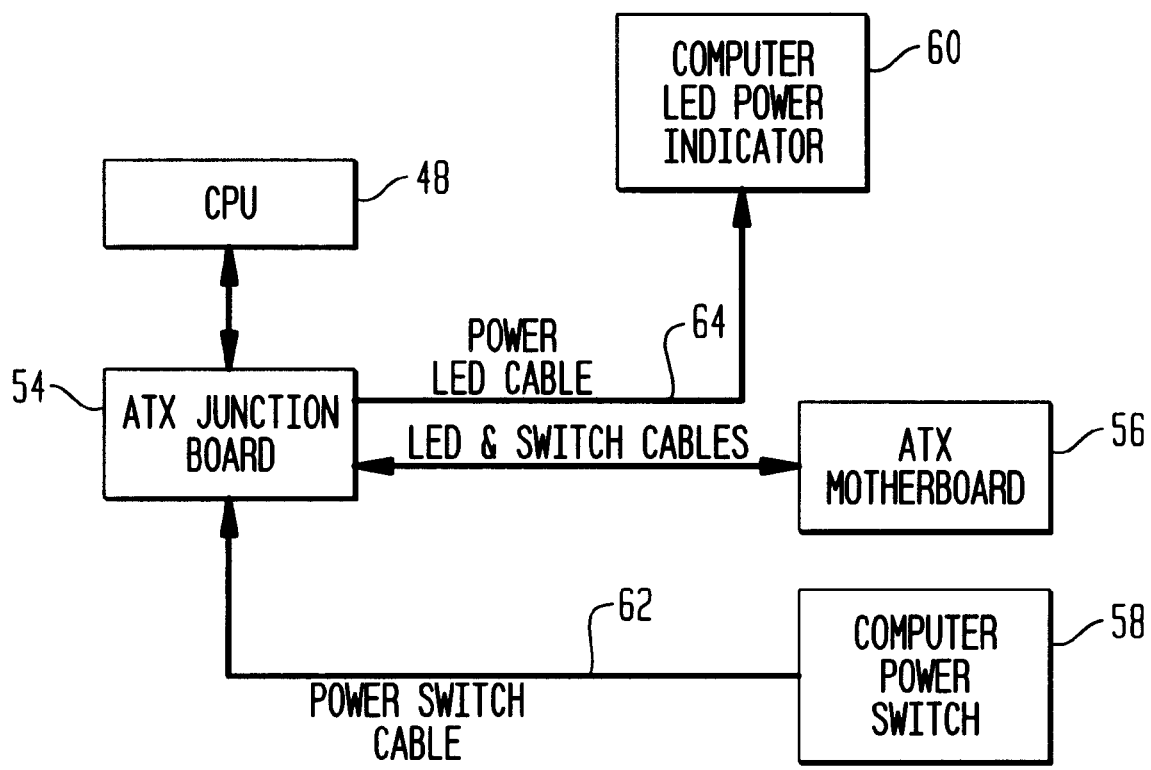
FIG. 4 is a block diagram of the ATX junction board component of the preferred embodiment of FIG. 1.

Turning now to FIG. 4, which is a block diagram of the ATX junction board 54 component of the preferred embodiment of the apparatus 14 that detects and acts on a host computer 12 equipped with an ATX motherboard 56. FIG. 4 illustrates the CPU 48, the computer power switch 58 and the computer LED power indicator 60 in order to demonstrate the flow of signal and power from, to and among these components. The ATX junction board 54, the power-switch cable 62 and the power LED cable 64 are installed within the host computer 12. The ATX junction board 54, now referring again to FIG. 1, interconnects with the apparatus 14 at its ATX/SER control port 66 via the ATX cable 68, enabling bi-directional signal transmission.

FIG. 6 also illustrates, in additional detail to FIG. 4 the wiring and components of the ATX detection feature in accordance with the preferred embodiment of the present invention.

The function of a preferred embodiment of the apparatus 14, and its flow of data and power, along with their effects on the host computer 12, now will be described in detail. FIGS. 5A and 5B are helpful to appreciate the protocol of the present invention, and should be referred to during the following discussion. It is assumed that a single outside telephone line 18 is connected to the modem of the host computer 12 and is utilized by the apparatus 14, unless otherwise stated. The user sets the line/phone switch 42 on the apparatus 14. In its line-in position, the apparatus 14 receives the remote user's DTMF signals from the outside telephone line 18 via the host computer's 12 modem part but not modem itself (or directly from its own outside telephone line, if so provided) The same pathway is used by the apparatus 14 to send signals to the remote user. With the line/phone switch 42 in the same position, the telephone set 20 is enabled as an extension, and is powered by the central telephone office via the outside telephone line 18.

When the line/phone switch 42 is in the telephone position, the outside telephone line 18 is disconnected and electrically isolated from apparatus 14, and the telephone set 20 is substituted for the outside telephone line 18 for transmission of signals to and from the apparatus 14. The telephone set 20 is now powered by the voltage regulator 25 (see FIG. 2) contained within the apparatus 14. The telephone set 20 keypad becomes the input device for programming and controlling the apparatus 14, and its receiver becomes a monitoring device for host system status and the status of the apparatus 14.

As a security measure, the password and other programmable security features can only be accessed and altered via the telephone set 20 to safeguard against their remote alteration or compromise. FIG. 4 demonstrates the ATX junction board 54, the power LED cable 64 and the power switch cable 62. There are two additional cable sets that interconnect the ATX junction board 54 and the ATX motherboard 56. The power LED cable 64 interconnects the computer LED power indicator 60 with the ATX junction board 54. The power switch cable 62 interconnects the ATX junction board 54 with the computer power switch 58.

Referring to FIG. 1, the ATX cable 68 interconnects the ATX junction board (not shown) and the apparatus 14. Referring to FIG. 2, the apparatus 14 monitors the ATX motherboard 56 and detects whether or not the ATX motherboard 56 is powered. The apparatus 14 controls and tracks the status of the power strip 38.

When the CPU 48 receives an ON command, its internal arbitration logic determines whether or not the power strip 38 is already ON. If the power strip 38 is ON, the ON command is ignored, an ascending tone is sent to the remote user, and the CPU 48 awaits the next command. If the system is in a standby mode, the apparatus 14 will cause the computer 12 to "wake up" and thereby place the system in an active mode.

If the CPU 48 receives an ON command and the power strip 38 is detected to be OFF, then the CPU 48 sends a signal to the power strip 38 via a typical telephone cable, closing a relay 52 (FIG. 3) that powers the power strip 38. If the apparatus 14 detects that the host computer 12 has an ATX motherboard 56, the CPU 48 waits 6 seconds for power to stabilize, and then sends a signal to the ATX junction board 54 that momentarily closes the contact in the host computer 12 power switch 58.

The CPU 48 waits 6 seconds and rechecks the status of the ATX motherboard 56, and if the ATX motherboard 56 is powered, an ascending tone is sent to the remote user. If it is still not powered, the CPU 48 alerts the remote user with a descending tone and de-powers the power strip 38. In either event, the CPU 48 awaits the next command. If the CPU 48 receives an OFF command, its arbitration logic first detects the status of the power strip 38. If it is OFF already, an ascending tone is sent to the remote user and the CPU 48 awaits the next command.

If the CPU 48 receives an OFF command and detects an ON condition of the power strip 38 and the presence of an ATX motherboard 56, the CPU 48 sends a series of commands that closes all open applications and then closes the Windows platform. In an ATX motherboard-equipped system, this action de-powers the motherboard. The CPU 48 waits 2 minutes for an orderly shutdown of the ATX motherboard 56 and it then sends a signal to the relay that de-powers the power strip 38, regardless of its status. The system also is capable of executing a "sleep" or standby command to put the host computer in a "sleep" or standby mode.

In a non-ATX system, an OFF command is received to induce an orderly shutdown in which the CPU 48 causes it to close all open applications, close the operating platform, trigger the relay within the power strip 38 and de-power it. Two descending tones are then sent to the remote user, and the CPU 48 awaits the next command.

If a host computer 12 cannot be successfully powered down by the above practice, remote user may send a command signal to the CPU 48 that instantaneously de-powers the power strip 38 without regard to host computer's status. This affects the same result as removing the entire host computer's power cord from its 117 VAC outlet. The CPU 48 then sends two descending tones to the user. This may be referred to as an emergency OFF command.

The apparatus 14 may contain a microphone 70 that is brought on line by the DAA 44 when a remote user establishes telephone contact with the apparatus 14. The microphone 70 monitors and transmits room sounds at the host computer 12 site to the DAA 44, which then transmits these sounds to the remote user. The remote user can thereby monitor and confirm the results of commands executed on the host computer 12 through the apparatus 14.

The above facilities enable the remote user, utilizing only the DTMF tones of a touch-tone telephone, or other DTMF tone generating device, to control the power supply of any host computer 12, including a host equipped with an ATX motherboard. These facilities enable a remote user to de-power a host computer 12 system in an orderly way so as not to cause a system failure or malfunction, upon re-start. The power control facilities enable the re-start or cold-boot of a host computer 12 that is OFF, even if equipped with an ATX motherboard. Further, these facilities enable the remote user to de-power or power a host computer 12 that is "locked-up" and completely unresponsive to keyboard commands. This capability includes the complete disconnection of the host computer 12 from its power source.

In the event that the host computer 12 is unresponsive to commands, both ATX and non-ATX systems can be de-powered directly without running the shut-down routine, by the use of a special DTMF signal that immediately de-powers the power strip 38. This capability enables the remote user to effectively "unplug" the computer system from its power source, which is sometimes necessary to remedy any of a class of catastrophic system failures.

It should be appreciated that the apparatus 14 effects remote keystroke insertion, remote cold and warm booting capabilities and remote power control as if at the host computer's keyboard 22 or power supply. It also should be appreciated that the facilities of the apparatus 14, as taught herein, comprise new capabilities for remote control of a host computer 12 system. Apparatus 14 represents an improvement over prior art methods for exercising remote control over a host computer 12. Such improvement is particularly significant because the apparatus 14 does not require the use of a remote computer or any level of operation of the host computer 12, its operating platform or its software.

Many modifications and variations besides those specifically mentioned above may be made to the embodiment of the apparatus 14 described herein without departing substantially from the concept of the apparatus 14. Accordingly, it should be clearly understood that the form of the present invention as described herein is exemplary only and is not intended as a limitation on the scope of the present invention.

Other embodiments of the same invention, for example, can be produced in the form of an OEM card that can be housed internally within the host computers. Other embodiments can be produced to exercise remote control of non-Windows/DOS-based host computer 12s (including, but not limited to, Macintosh systems, UNIX systems, et al) by the apparatus 14. Other embodiments of the apparatus 14 can incorporate voice recognition and response capabilities, video transfer capabilities, host computer 12 monitoring capabilities, a modem and the ability to exercise control via the Internet. Other embodiments can incorporate hardware and firmware that can utilize standard network protocols such as SNMP, and interface with network system agents and management systems.

While the foregoing description illustrates preferred embodiments of the various apparatus and methods in accordance with the apparatus 14, it should be appreciated that the invention also covers various permutations of the foregoing described features, and that certain modifications may be made in the foregoing without departing from the spirit and scope of the present invention which is defined by the claims set forth immediately hereafter.

What is claimed is:

1. An apparatus for remotely operating a general-purpose computer, comprising:
   a) a telephone line interface for receiving a plurality of remotely generated DTMF tones;
   b) a data access arrangement (DAA) device coupled to said telephone line interface for detecting and routing the received DTMF tones;
   c) a DTMF tone transceiver coupled to said DAA device for receiving and converting the received DTMF tones to corresponding digital signals;
   d) a CPU coupled to said DTMF tone transceiver for receiving and converting the digital signals to keyboard data signals; and
   e) a switch coupled to said CPU for routing the keyboard data signals to the local keyboard controller to operate the general purpose computer, whereby the keyboard data signals are substituted for the general purpose computer's keyboard controller's signals.

2. The apparatus of claim 1, further comprising a power supply coupled to said CPU for providing power to the general-purpose computer.

3. The apparatus of claim 2 wherein said DTMF tones include a Power-ON command, which is converted and routed through to said power supply, which, in turn, is instructed to power the general-purpose computer from an inactive state.

4. The apparatus of claim 3 wherein said power supply powers the motherboard of the general-purpose computer.

5. The apparatus of claim 2 being capable of executing a de-powering command, whereby said power supply is instructed to de-power the general-purpose computer.

6. The apparatus of claim 5 wherein said power supply de-powers the motherboard of the general-purpose computer.

7. The apparatus of claim 2 being capable of executing a recycling command, whereby said power supply is instructed to reinitialize the general-purpose computer.

8. The apparatus of claim 2, further comprising an ATX detector coupled to said CPU for detecting the presence of an ATX-type motherboard in the general-purpose computer.

9. A method for remotely operating a general-purpose computer, comprising the steps of:
   a) receiving a plurality of remotely generated DTMF tones;
   b) disabling the local keyboard of the general-purpose computer;
   c) converting said plurality of DTMF tones into keyboard data signals; and
   d) sending said keyboard data signals to the general-purpose computer's keyboard controller to operate the general-purpose computer, whereby the general-purpose computer executes keystroke commands in accordance with said keyboard data signals, including all system and operating platform commands, as if said keyboard data signals were coming from the general-purpose computer's local keyboard.

10. A method as claimed in claim 9 wherein said converting step includes the step of converting said plurality of DTMF tones into corresponding digital signals.

11. A method as claimed in claim 9, wherein said converting step comprises the steps of:
   a) receiving said plurality of DTMF tones through a data access arrangement (DAA) device;
   b) routing said plurality of DTMF tones to a DTMF transceiver for converting said plurality of DTMF tones into corresponding digital signals;
   c) transmitting said corresponding digital signals to a CPU, wherein the CPU compares the incoming digital signal with an embedded conversion table to thereby convert the digital signal into a keyboard control signal for controlling the general purpose computer.

* * * * *

UNITED STATES PATENT AND TRADEMARK OFFICE
CERTIFICATE OF CORRECTION

PATENT NO. : 6,160,873
DATED : December 12, 2000
INVENTOR(S) : Truong et al.

It is certified that error appears in the above-identified patent and that said Letters Patent is hereby corrected as shown below:

```
Col. 5, line 6, "equippe d" should read --equipped--.

Col. 5, line 20, "DiMF" should read --DTMF--.

Col. 7, line 15, "apparatus," should read --apparatus'--.

Col. 10, line 1, "apparatus²" should read --apparatus'--.

Col. 16, line 41, after ")" insert --.--.
```

Signed and Sealed this

Eighth Day of May, 2001

*Attest:*

NICHOLAS P. GODICI

*Attesting Officer*     *Acting Director of the United States Patent and Trademark Office*